United States Patent [19]

Kanesaki

[11] Patent Number: 4,881,369
[45] Date of Patent: Nov. 21, 1989

[54] EXHAUST GAS PURIFYING APPARATUS

[75] Inventor: Nobukazu Kanesaki, Kanagawa, Japan

[73] Assignee: Nissan Motor Company, Limited, Yokohama, Japan

[21] Appl. No.: 53,741

[22] Filed: May 26, 1987

[30] Foreign Application Priority Data

May 27, 1986 [JP] Japan .................................. 61-78773

[51] Int. Cl.$^4$ ................................................ F01N 3/02
[52] U.S. Cl. ........................................................ 60/285
[58] Field of Search ................................. 60/285, 274

[56] References Cited

U.S. PATENT DOCUMENTS

| 4,211,075 | 7/1980 | Ludecke | 60/285 |
| 4,452,040 | 6/1984 | Kobashi | 60/285 |
| 4,462,208 | 7/1984 | Hicks | 60/286 |
| 4,685,290 | 8/1987 | Kamiya | 60/285 |

FOREIGN PATENT DOCUMENTS 61-17416  1/1986 Japan .
61-108822 7/1986 Japan .

Primary Examiner—Douglas Hart
Attorney, Agent, or Firm—Foley & Lardner, Schwartz, Jeffery, Schwaab, Mack, Blumenthal & Evans

[57] ABSTRACT

An exhaust gas purifying apparatus for use in an internal combustion engine into which fuel is injected at a proper timing. The apparatus includes a catalytic trap located in the engine exhaust system for collecting the exhaust particles discharged thereto from the engine and burning the collected exhaust particles under catalytic action. A control unit controls the fuel injection timing in accordance with engine operating conditions. The control unit retards the fuel injection timing when the engine exhaust gas temperature is in a predetermined range and the pressure differential across the catalytic trap exceeds a reference value.

8 Claims, 5 Drawing Sheets

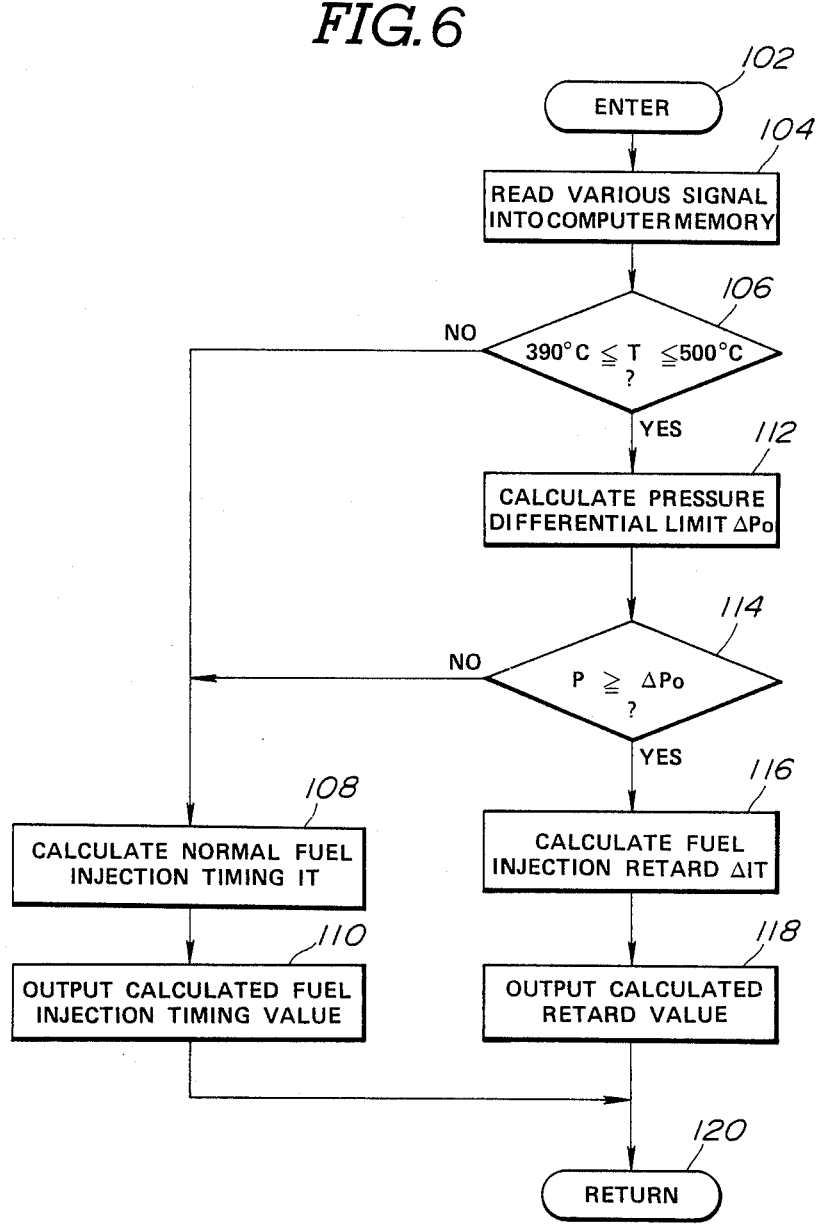

EXHAUST GAS PURIFYING APPARATUS

BACKGROUND OF THE INVENTION

This invention relates to an exhaust gas purifying apparatus for use in an internal combustion engine having a catalytic trap provided in the engine exhaust system.

Internal combustion engines discharge undesirable exhaust gas constituents, such as unburned carbon particles, to the atmosphere. The emission from an engine tends to increase at low- or intermediate-speed and high-load conditions where the engine requires a mixture having a richer air-fuel ratio. This is true particularly for diesel engines.

It has been proposed to purify such exhaust gas constituents by employing a catalytic trap located in the engine exhaust system for collecting the exhaust particles discharged thereto from the engine and burning the collected exhaust particles under catalytic action. However, the exhaust particle burning capacity of the catalytic trap is dependent greatly on the engine operating conditions and it becomes smaller than the amount of the exhaust particles collected in the catalytic trap particularly in a certain engine operating range, as described later in greater detail. In such an engine operating range, the catalytic trap gets clogged with the exhaust particles accumulated therein to increase the engine exhaust pressure, causing engine output power reduction and fuel economy loss.

SUMMARY OF THE INVENTION

Therefore, it is a main object of the invention to provide an improved exhaust purifying apparatus which can purify engine exhaust gases with high efficiency over the entire engine operating range.

There is provided, in accordance with the invention, an exhaust gas purifying apparatus for use in an internal combustion engine into which fuel is injected at a timing. The engine has an exhaust system through which exhaust particles are discharged from the engine to the atmosphere. A catalytic trap is located in the engine exhaust system for collecting the exhaust particles and burning the collected exhaust particles. The apparatus comprises a first sensor sensitive to engine exhaust gas temperatures for providing a signal indicative of a sensed engine exhaust gas temperature, a second sensor sensitive to pressure differentials across the catalytic trap for providing a signal indicative of a sensed pressure differential, and means sensitive to engine operating conditions for producing signals indicative of sensed engine operating conditions. The apparatus also includes a control unit responsive to the sensed engine operating condition indicative signals for controlling the fuel injection timing. The control unit includes means responsive to the signals from the first and second sensors for retarding the fuel injection timing when the engine exhaust gas temperature is in a predetermined range and the sensed pressure differntial exceeds a reference value.

BRIEF DESCRIPTION OF THE DRAWINGS

This invention will be described in greater detail by reference to the following description taken in connection with the accompanying drawings, in which:

FIG. 6 is a flow diagram illustrating the programming of the digital computer as it is used to control the fuel injection timing of the engine.

DETAILED DESCRIPTION OF THE INVENTION

Figure 1:
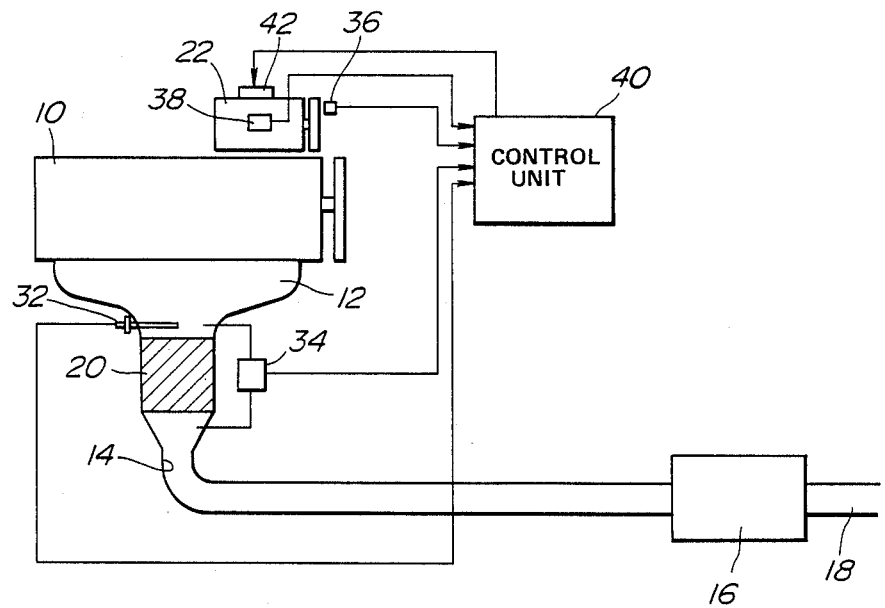
FIG. 1 is a schematic sectional view showing one embodiment of an exhaust gas purifying apparatus made in accordance with the invention.

With reference to the drawings and particular to FIG. 1, there is shown an exhaust gas purifying apparatus embodying the invention. A diesel engine, generally designated by the numeral 10, for an automotive vehicle is shown in a schematic form as having an exhaust manifold 12 connected to an engine exhaust system which includes an exhaust conduit 14, a muffler 16, and an exhaust pipe 18. A catalytic trap 20 is connected at its inlet end to the exhaust manifold 12 and at its outlet end to the exhaust conduit 14.

In the operation of the engine, fuel is injected into the engine combustion chamber from a fuel injection pump 22 and mixes with the air therein. The air-fuel mixture is then ignited in the combustion chamber. Combustion of the air-fuel mixture in the combustion chamber takes place, releasing heat energy. The resulting exhaust gases are discharged into the exhaust manifold 12. The exhaust gases pass from the exhaust manifold 12 through the catalytic trap, and then through the exhaust system to the atmoshpere.

The catalytic trap 20 has a capacity of collecting the exhaust particles discharged through the exhaust manifold 12 from the engine 10 and a capacity of re-burning the collected exhaust particles under its catalytic action so as to minimize the amount of carbon and other undesirable exhaust particles discharged to the atmosphere. The exhaust particle re-burning capacity is dependent on engine operating conditions.

Figure 2:
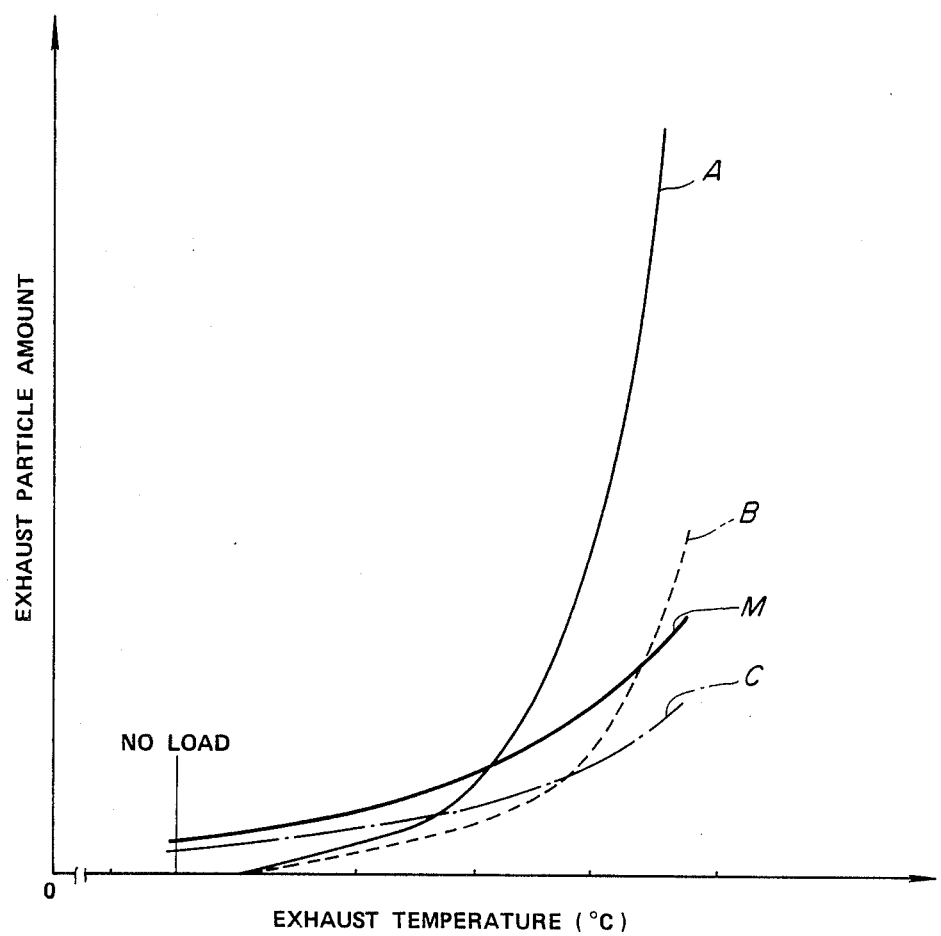
FIG. 2 is a graph of exhaust particle amount versus exhaust temperature.

The exhaust particle burning capacity, in the form of the amount of exhaust particles the catalytic trap 20 can burn in a unit time, increases with increasing exhaust gas temperature, as indicated by the solid curve A of FIG. 2. Although the catalytic trap 20 can re-burn the collected exhaust particles as long as the exhaust gas temperature is higher than about 200° C., its exhaust particle burning capacity is less than the amount of the exhaust particles discharged from the engine (indicated by the curve M of FIG. 2) until the exhaust gas temperature reaches about 500°. Therefore, it is advantageous in practice that the catalytic trap 20 have an exhaust particle collecting capacity as small as possible in order that the catalytic trap 20 can be used over a wider range of engine operating conditions without getting clogged with exhaust particles to an extent causing an excessive exhaust pressure increase.

Normally, in an engine operating range where the amount of the exhaust particles collected in the catalytic trap 20 is less than its exhaust particle burning capacity, the catalytic trap 20 can re-burn the collected exhaust particles continuously and cannot get clogged. Although, in another engine operating range where the amount of the exhaust particles collected in the catalytic trap 20 is in excess of the exhaust particle burning capacity, the whole amount or a part of the collected exhaust particles remains and accumulates in the catalytic trap 20, the engine discharges such a relatively small amount of exhaust particles that the catalytic trap 20 can re-burn the whole amount of the accumulated exhaust particles since the exhaust gas temperature is relatively high in this engine operating range. That is, the fact that the catalytic trap 20 is not active at low exhaust gas temperatures raises no problem over the entire engine operating range. However, a great amount of exhaust particles will accumulate to increase the exhaust pressure to an extent causing an adverse influence on the engine performance in such a special engine operating mode where the amount of the exhaust particles discharged from the engine is in excess of the exhaust particle burning capacity of the catalytic trap 20 over the entire engine operating range.

Figure 3:
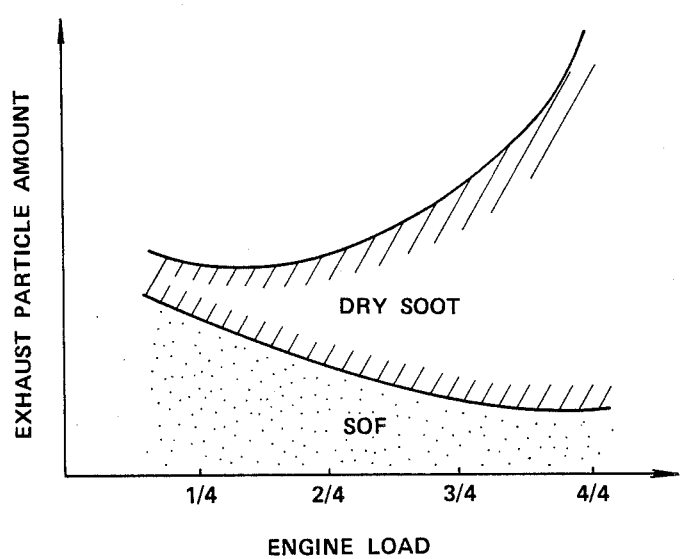
FIG. 3 is a graph of exhaust particle amount versus engine load.

The exhaust particle burning capacity is also dependent on the consitution of the exhaust particles discharged from the engine to the catalytic trap 20. The greater the percentage of SOF (combustible components soluble in organic solvents), the greater the exhaust 0 particle burning capacity of the catalytic trap 20. Normally, the SOF's percentage decreases with increasing engine load, as shown in FIG. 3, although it differs from one engine to another.

At low load conditions, the exhaust gas temperature is relatively low and the percentage of the SOF included in the exhaust particles discharged to the catalytic trap 20 is relatively great so that the catalytic trap 20 can re-burn the collected exhaust particles as soon as the engine exhaust temperature reaches about 390° C. at which the exhaust particle burning capacity, as indicated by the curve A of FIG. 2, exceeds the amount of the exhaust particles collected in the catalytic trap 20. This amount is indicated by the curve C of FIG. 2 which corresponds to 70 percents of the exhaust particle collecting capacity of the catalytic trap 20. In an engine operating range where the exhaust gas temperature is in a range of about 390° C. to about 500° C., however, the exhaust particles discharged to the catalytic trap 20 contains a small percentage of SOF so that the catalytic trap 20 has a smaller exhaust particle burning capacity, as indicated by the broken curve B of FIG. 2, and fails to re-burn the whole amount of the exhaust particles collected therein. If the engine is held in this engine operating range for a long time, a great amount of exhaust particles will accumulate in the catalytic trap 20, causing an excessive exhaust pressure increase.

Figure 4:
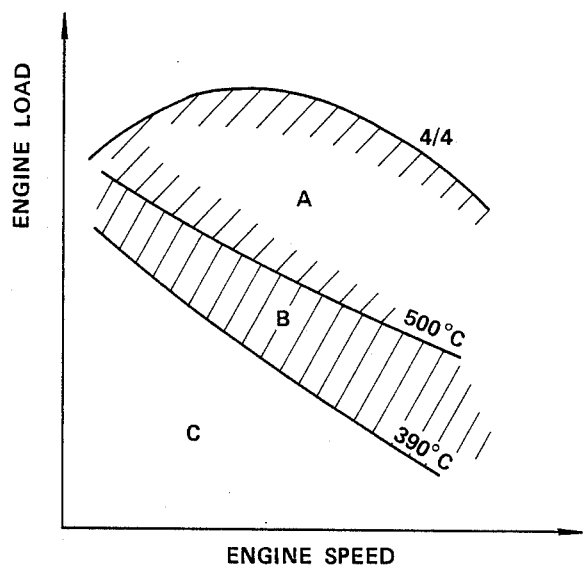
FIG. 4 is a graph of engine load versus engine speed for three different engine operating ranges.

Referring to FIG. 4, the region A indicates a first engine operating range where the exhaust gas temperature is sufficiently high (about 500° C. or more). In the first engine operating range. Tee catalytic trap 20 has an exhaust particle burning capacity greater than the amount of the exhaust particles collected therein so that the catalytic trap 20 can re-burn the exhaust particles which have accumulated therein during an 0 engine operating range where the exhaust gas temperature is relatively low as will as the exhaust particles collected therein in this engine operating range. The region B indicates a second engine operating range where the exhaust particles discharged to the catalytic trap 20 contains a smaller amount of combustible constituents so that the exhaust particle burning capacity is somewhat less than the amount of the exhaust particles collected in the catalytic trap 20. The region C indicates a third engine operating range where the exhaust particles discharged to the catalytic trap 20 contains a relatively great percentage of SOF; however, the exhaust gas temperature is low so that the exhaust particles accumulate in the catalytic trap 20. The third engine operating range will shift to the first or second engine operating range where the exhaust particles accumulated in the third engine operating range is re-burn in a short time.

It will be apparent from the foregoing analysis that the exhaust particle burning capacity of the catalytic burner 20 can be improved to a considerable extent by increasing the percentage of SOF contained in the exhaust particles discharged from the engine. It is true particularly for the second engine operating range indicated by the character B of FIG. 4.

Figure 5:
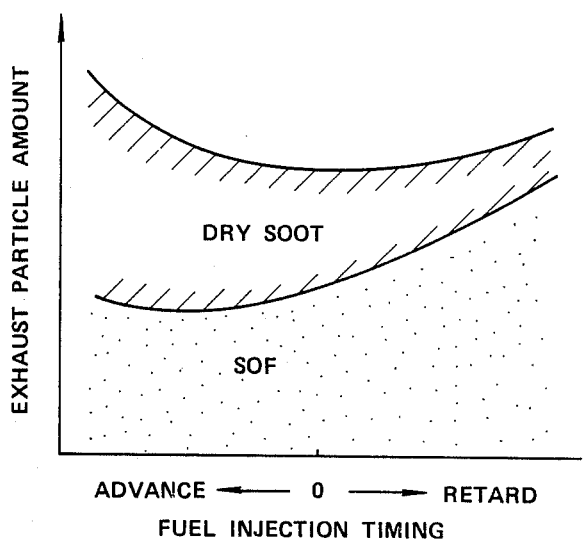
FIG. 5 is a graph of exhaust particle amount versus fuel injection timing.

The applicant has found the tendency of the percentage of SOF included in the exhaust particles to increase with the fuel injection timing retarded, as shown in FIG. 5. The invention utilizes this tendency to improve the exhaust particle burning capacity of the catalytic trap 20 particularly in the second engine operating range indicate by the character B of FIG. 4.

Returning to FIG. 5 the apparatus includes various sensors including an exhaust gas temperature sensor 32, a pressure differential sensor 34, an engine speed sensor 36, and an engine load sensor 38. The 0 exhaust gas temperature sensor 32 preferably is mounted in the engine exhaust manifold 12 upstream of the catalytic trap 20 and comprises a thermistor connected in an electrical circuit capable of producing a voltage signal having a variable level proportional to the exhaust gas temperature. The pressure differential sensor 34 preferably comprises a first pressure sensor positioned to measure the pressure on the inlet side of the catalytic trap 20, a second pressure sensor positioned to measure the pressure on the outlet side of the catalytic trap 20, and a circuit connected to the first and second pressure sensors for producing a voltage signal having a variable level proportional to the pressure differential across the catalytic trap 20. The engine speed sensor 36, which may be in the form of a crankshaft position sensor, produces a series of pulses at a repetitive rate corresponding to the engine speed. The engine load sensor 38, which may include a potentiometer drivingly connected to the control lever of the fuel injection pump 22, generates a voltage signal having a variable level proportional to the engine load.

These sensors 32, 34, 36 and 38 are connected to a control unit 40 which is connected to a timer 42 used to control the fuel injection timing of the fuel injection pump 22. The control unit 40 determines a normal value IT for fuel injection timing according to the existing engine operating conditions and sets the determined normal fuel injection timing value IT in the timer 42 to cause the fuel injection pump 22 to inject fuel into the engine at the determined normal fuel injection timing. The control unit 40 also determines a pressure difference limit value $\Delta Po$ above which the existing exhaust pressure may have an adverse influence on the engine performance according to the existing engine operating conditions, determines a retard value $\Delta IT$ by which the normal fuel injection timing should be retarded in a selected engine operating range where the exhaust gas temperature is in a range of about 390° C. to about 500° C. and the pressure differential across the catalytic trap 20 exceeds the determined limit value $\Delta Po$. The control unit 40 sets the determined retard value IT in the timer 42 to retard the normal fuel injection timing IT by the determined retard value ΔIT in order to increase the percentage of SOF included in the exhaust particles so as to increase the exhaust particle burning capacity of the catalytic trap 20. For simplicity, the control unit 40 may be arranged to set a predetermined constant retard value in the timer 42, regardless of engine operating conditions, in the selected engine operating range.

The control unit 40 may includes a digital computer which should be considered as including a central processing unit (CPU), a random access memory (RAM), a read only memory (ROM), and an input/output control circuit. The ROM contains the program for operating the central processing unit and further contains appropriate data in look-up tables used in calculating appropriate values for fuel injection timing. The look-up data may be obtained experimentally or derived empirically.

FIG. 6 is a flow diagram illustrating the programming of the digital computer as it is used in the control unit 40 to determine appropriate values for fuel injection timing.

The computer program is entered at the point 102. At the point 104 in the program, the signals from the various sensors 32, 34, 36 and 38 are read into the computer memory. At the point 106, a determination is made as to whether or not the exhaust gas temperature T, sensed by the exhaust gas temperature sensor 32, is in a range from 390° C. to 500° C. If the answer, to this question is "no", then the program proceeds to the point 108 where the digital computer central processing unit calculates a normal fuel injection timing value IT from a relationship programmed into the computer. This relationship defines the normal fuel injection timing value as a function of engine speed N and engine load L. Following this, at the point 110, the calculated normal fuel injection timing value IT is transferred to set it into the timer 42 which thereby controls the fuel injection pump 22 to inject fuel into the engine at the calculated normal fuel injection timing.

If the answer to the question inputted at the point 106 is "yes", then the program proceeds to the point 112 where a pressure differential limit value ΔPo above which the existing exhaust pressure may have an adverse influence on the engine performance is calculated from a relationship programmed into the computer. This relationship defines the limit value ΔPo as a function of engine speed N and engine load L. Following this, the program proceeds to a determination step at the point 114. This determination is as to whether or not the sensed pressure differential P across the catalytic trap 20 is equal to or greater than the calculated limit value ΔPo. If the answer to this question is "no", then the program proceeds to the point 108.

If the answer to the question inputted at the point 114 is "yes", then it means that the engine is operating in a selected operating range where the exhaust gas temperature T is in the range of 390° C. to 500° C. and the pressure differential P across the catalytic trap 20 is equal to or less than the limit value ΔPo, and the program proceeds to the point 116. At the point 116, the digital computer central processing unit calculates a retard value ΔIT from a relationship programmed into the computer. This relationship defines the retard value ΔIT as a function of engine speed N and engine load N. Following this, the program proceeds to the point 118 where the calculated retard value ΔIT is outputted to set it in the timer 42 which thereby retard the normal fuel injection timing IT of the fuel injection pump 22 by the calculated retard value ΔIT. Following this, the program proceeds to the point 120 where the program returns to the point 104.

It is apparent from the foregoing that there is provided, in accordance with the invention, an exhaust gas purifying apparatus which permits a catalytic trap provided in an engine exhaust system to operate with higher efficiency by retarding the timing of fuel injection to the engine in a specified engine operating range where the exhaust gas temperature is in a range of 390° C. to 500° C. and the pressure differential across the catalytic trap is less than a predetermined value. It is, therefore, possible to avoid an excessive exhaust pressure increase which may cause engine output power drop and fuel economy loss.

What is claim is:

1. An exhaust gas purifying apparatus for use in an internal combustion engine into which fuel is injected at a timing, the engine having an exhaust system through which exhaust particles are discharged from the engine to the atmosphere, comprising:

catalytic trap means disposed in the exhaust system for collecting the exhaust particles and burning the collected exhaust particles;

first sensor means sensitive to engine exhaust gas temperatures for providing a signal indicative of a sensed engine exhaust gas temperature;

second sensor means sensitive to pressure differentials across the catalytic trap means for providing a signal indicative of a sensed pressure differential;

means sensitive to engine operating conditions for producing signals indicative of sensed engine operating conditions; and a control unit responsive to the sensed engine operating condition indicative signals for controlling the fuel injection timing, the control unit including means responsive to the signals from the first and second sensors for retarding the fuel injection timing when the engine exhaust gas temperature is in a predetermined range and the sensed pressure differential exceeds a reference value.

2. The exhaust gas purifying apparatus as claimed in claim 1, wherein the control unit includes means for determining a retard value in accordance with the sensed engine operating conditions, and means for retarding the fuel injection timing by the determined retard value when the engine exhaust gas temperature is in the predetermined range and the sensed pressure differential exceeds the reference value.

3. The exhaust gas purifying apparatus as claimed in claim 2, wherein the control unit includes means for determining the reference value in accordance with the sensed engine operating conditions.

4. The exhaust gas purifying apparatus as claimed in claim 1, wherein the control unit includes means for retarding the fuel injection timing by a predetermined constant value when the engine exhaust gas temperature is in the predetermined range and the sensed pressure differential exceeds the reference value.

5. The exhaust gas purifying apparatus as claimed in claim 4, wherein the control unit includes means for determining the reference value in accordance with the sensed engine operating conditions.

6. The exhaust gas purifying apparatus as claimed in claim 1, wherein the control unit includes means for determining the reference value in accordance with engine operating conditions.

7. The exhaust gas purifying apparatus as claimed in claim 1, wherein the predetermined engine exhaust gas temperature range extends from about 390° C. to about 500° C.

8. An exhaust gas purifying apparatus for use in an internal combustion engine having an exhaust system and a fuel injection pump comprising:

catalytic trap means disposed in the exhaust system for collecting exhaust particles and burning the particles;

first sensor means sensitive to exhaust gas temperatures for providing a signal indicative of a sensed engine exhaust gas temperature;

second sensor means sensitive to pressure differentials across the catalytic trap means for providing a signal indicative of a sensed pressure differential;

means sensitive to engine load and speed conditions for producing signals indicative of said load and speed conditions;

timer means for controlling fuel injection timing of the fuel injection pump; and a control unit responsive to the signals indicative of said load and speed conditions for controlling the fuel injection timing, and responsive to the signals indicative of said temperature and pressure differential for retarding the fuel injection timing when the temperature is in a predetermined range and the pressure differential exceeds a reference value.

* * * * *